United States Patent
Mills

(10) Patent No.: US 10,481,618 B2
(45) Date of Patent: Nov. 19, 2019

(54) INJECTION FLOW CONTROLLER FOR WATER AND STEAM

(71) Applicant: BRISTOL, INC., Watertown, CT (US)

(72) Inventor: Thomas Matthew Mills, Katy, TX (US)

(73) Assignee: BRISTOL, INC., Watertown, CT (US)

( * ) Notice: Subject to any disclaimer, the term of this patent is extended or adjusted under 35 U.S.C. 154(b) by 237 days.

(21) Appl. No.: 14/685,069

(22) Filed: Apr. 13, 2015

(65) Prior Publication Data

US 2015/0293536 A1    Oct. 15, 2015

Related U.S. Application Data

(60) Provisional application No. 61/983,287, filed on Apr. 23, 2014, provisional application No. 61/978,693, filed on Apr. 11, 2014.

(51) Int. Cl.
| | |
|---|---|
| G05D 7/06 | (2006.01) |
| E21B 43/16 | (2006.01) |
| G05B 19/05 | (2006.01) |
| E21B 43/24 | (2006.01) |

(52) U.S. Cl.
CPC .......... G05D 7/0617 (2013.01); E21B 43/16 (2013.01); E21B 43/24 (2013.01); G05B 19/05 (2013.01)

(58) Field of Classification Search
CPC ....... G05D 7/0617; E21B 43/16; E21B 43/24; G05B 19/05
USPC ........................................................ 700/282
See application file for complete search history.

(56) References Cited

U.S. PATENT DOCUMENTS

| | | | |
|---|---|---|---|
| 4,721,158 A * | 1/1988 | Merritt, Jr. | ............. E21B 43/12 166/250.01 |
| 6,937,923 B1 | 8/2005 | Bassett | |
| 2004/0118558 A1 | 6/2004 | Rial et al. | |
| 2004/0200615 A1 | 10/2004 | Wilde | |
| 2007/0276545 A1* | 11/2007 | Smirnov | ............. G05B 13/024 700/282 |

(Continued)

FOREIGN PATENT DOCUMENTS

| | | | |
|---|---|---|---|
| CN | 203147285 U | * | 8/2013 |
| CN | 203147285 U | | 8/2013 |

(Continued)

OTHER PUBLICATIONS

Search Report and Written Opinion of PCT Application No. PCT/US2015/025222 dated Aug. 31, 2015.
Examination Report for EP Application No. 15719059.6 dated Feb. 5, 2018.
First Office Action for RU Application No. 2016143747/03 dated Nov. 2, 2018.

(Continued)

*Primary Examiner* — Kenneth M Lo
*Assistant Examiner* — Michael W Choi
(74) *Attorney, Agent, or Firm* — Marshall, Gerstein & Borun LLP

(57) ABSTRACT

A method of controlling at least one of a flow rate or pressure of an injected fluid includes receiving a measured value indicative of the at least one of the flow rate or the pressure of the injected fluid, and determining a control mode for controlling the at least one of the flow rate or the pressure. The method further includes controlling the at least one of the flow rate or the pressure of the injected fluid according to the selected control mode including: determining a command signal to be communicated to a field device, and communicating the command signal to the field device.

20 Claims, 9 Drawing Sheets

(56) References Cited

U.S. PATENT DOCUMENTS

| | | | |
|---|---|---|---|
| 2008/0009978 A1* | 1/2008 | Smirnov | G05D 7/0635 |
| | | | 700/282 |
| 2009/0217686 A1* | 9/2009 | Bittner | F25D 17/02 |
| | | | 62/157 |
| 2009/0294123 A1 | 12/2009 | Mescall et al. | |
| 2011/0054702 A1* | 3/2011 | Smirnov | G05B 11/42 |
| | | | 700/282 |
| 2011/0320047 A1* | 12/2011 | Stone | E21B 43/00 |
| | | | 700/282 |
| 2012/0318523 A1 | 12/2012 | Wilde et al. | |
| 2013/0032336 A1* | 2/2013 | Abbate | E21B 43/24 |
| | | | 166/250.01 |
| 2013/0068452 A1 | 3/2013 | Wingate | |
| 2014/0034164 A1* | 2/2014 | Yasuda | G05D 7/0617 |
| | | | 137/599.01 |

FOREIGN PATENT DOCUMENTS

| | | |
|---|---|---|
| JP | 2003-504888 A | 2/2003 |
| JP | 2009-263674 A | 11/2009 |

OTHER PUBLICATIONS

Russian search report for RU Application No. 2016143747/03 dated Nov. 2, 2018.
Communication Pursuant to Article 94(3) EPC for EP Application No. 15719059.6 dated Sep. 20, 2018.
Office Action issued in European Patent Application No. 15719059.6, dated Jun. 13, 2019.
Office Action issued in Japanese Patent Application No. 2017-504614, dated May 14, 2019.

* cited by examiner

INJECTION FLOW CONTROLLER FOR WATER AND STEAM

CROSS-REFERENCE TO RELATED APPLICATIONS

This is a non-provisional patent application that claims priority to and the benefit of the filing date of U.S. Provisional Patent Application No. 61/978,693 entitled "Method, Apparatus, and System for Injection Flow Control for Water and Steam" and filed on Apr. 11, 2015 and U.S. Provisional Patent Application No. 61/983,287 entitled "Method, Apparatus, and System for Injection Flow Control for Water and Steam" and filed on Apr. 23, 2015, the disclosures of which are hereby incorporated by reference in their entirety.

FIELD OF THE DISCLOSURE

The present disclosure is directed to a method for controlling a pressure and/or flow rate of a fluid and, more particularly, to a method and apparatus for controlling a pressure and/or flow rate of a fluid based on multiple control modes.

BACKGROUND

In the oil and gas industry, it is increasingly common to inject water and/or steam into reservoirs (such as, e.g., an oil reservoir). These types of injections may be utilized to maintain or control a pressure within a reservoir and/or to introduce heat into the reservoir (e.g., to change a temperature within the reservoir). Water injected into a reservoir may replace extracted mass (e.g., oil) and, thus, influence a pressure in the reservoir. Steam injected into the reservoir may both replace extracted mass and cause changes in temperature.

Operators of wells often use programmable logic controllers (PLCs) to control the injection of water and/or steam into a reservoir. However, PLCs require Alternating Current (AC) power to operate, which requirement is unique as compared to the power requirements of other components at the site of a well. That is, other than a PLC, typical components of a process control system at the site of a well do not require AC power, and, in order to utilize PLCs to control the injection of water and/or steam (e.g., at a wellhead), operators must spend large sums of money to ensure that AC power is available at the sites of wells.

Moreover, some major oil operators are at least considering a classification of AC power sources (e.g., 120V AC) as "hazardous." If these operators make such a classification, only properly suited and licensed electricians will be able to service PLCs at the sites of wells, and this requirement would result in further costs associated with the use of PLCs to control water/steam injection. A use of PLCs can further result in a lack of consistency between injection processes. Because each PLC is individually programmable, one PLC controlling injection at a first wellhead may operate differently than another PLC controlling injection at a second wellhead. In such a case, operators are forced to send PLC programmers to make changes to the PLCs at each of the sites.

SUMMARY

In one embodiment, a method of controlling at least one of a flow rate or pressure of an injected fluid comprises receiving a measured value indicative of the at least one of the flow rate or the pressure of the injected fluid, and determining a control mode for controlling the at least one of the flow rate or the pressure, wherein determining the control mode includes selecting the control mode from a plurality of control modes based on the measured value. The method further includes controlling the at least one of the flow rate or the pressure of the injected fluid according to the selected control mode including: determining a command signal to be communicated to a field device, the field device coupled to a line through which the injected fluid flows, and communicating the command signal to the field device.

In another embodiment, a process control system comprises a process control device configured to control an injection of a fluid, a first communicative link between the process control device and at least one of a pressure sensor detecting a pressure of the fluid and a flow element detecting a flow rate of the fluid, and a second communicative link between the process control device and a field device, wherein the process control device communicates with the field device to control at least one of the pressure or the flow rate of the fluid. The process control device is configured to: receive, via the first communicative link, a measured value indicative of the at least one of the flow rate or the pressure of the fluid, determine a control mode for controlling the at least one of the flow rate or the pressure of the fluid, wherein determining the control mode includes selecting the control mode from a plurality of control modes based on the measured value, and control, via the second communicative link, the at least one of the flow rate or the pressure of the injected fluid according to the selected control mode.

In yet another embodiment, a process control device comprises one or more processors and a communication module configured to receive a measured value indicative of a pressure or flow rate of a fluid. The process control device also includes a primary objective control module specifically configuring the process control device such that, when executed by the one or more processors, the primary objective control module causes the process control device to maintain a reservoir pressure within a reservoir based on an injection of the fluid into the reservoir, and an override objective control module specifically configuring the process control device such that, when executed by the one or more processors, the override objective control module causes the process control device to reduce a measured pressure of the fluid to a level at or below a pressure threshold. Still further the process control device includes a control mode selector configured to: select one of the primary objective control module or the override objective control module based on the measured value, and cause the one or more processors to execute the selected one of the primary objective control module or the override objective control module.

DETAILED DESCRIPTION

Figure 1:
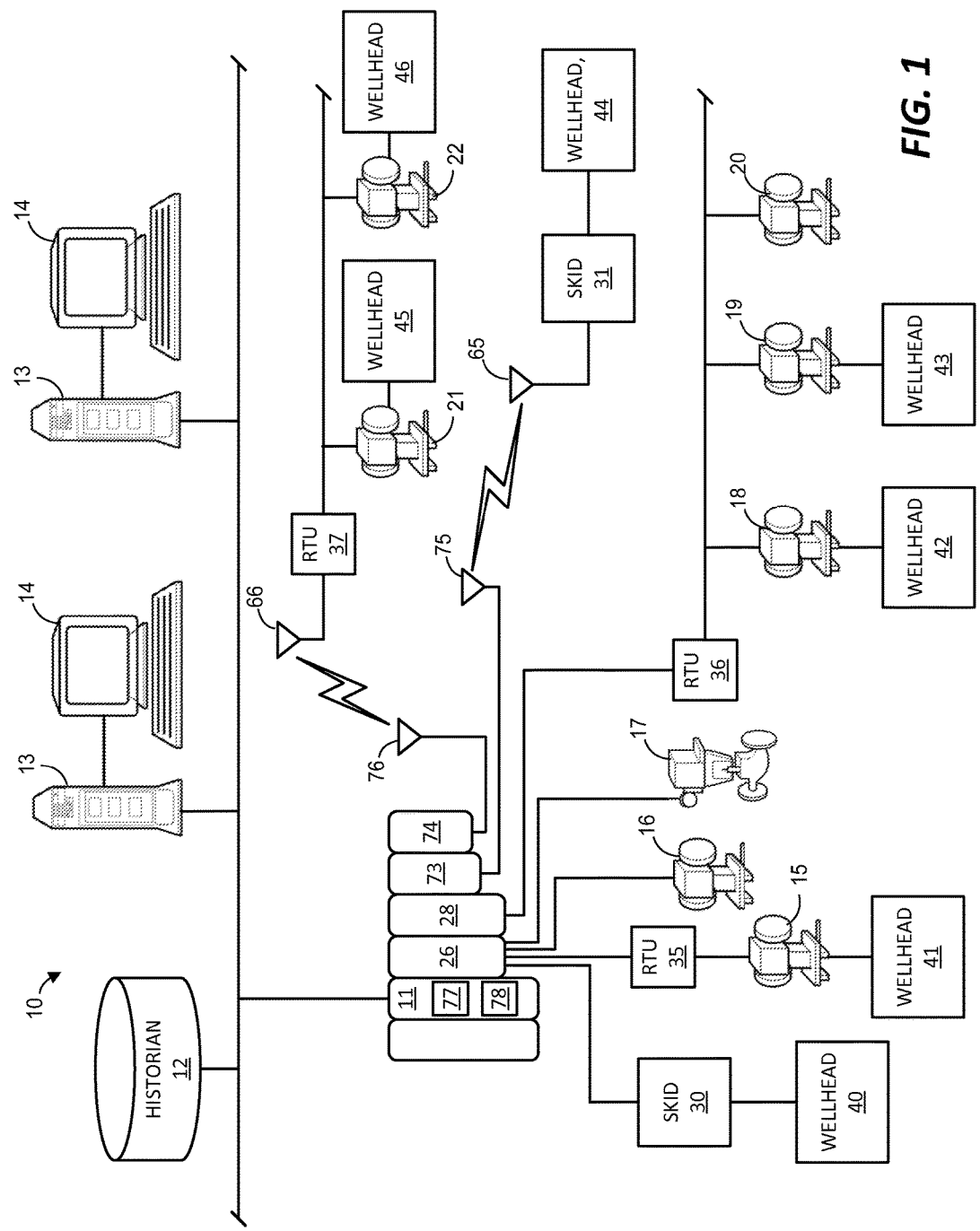
FIG. 1 illustrates an example process control system including one or more process control devices configured to control an injection of a fluid using multiple control modes.

The present disclosure is directed to controlling an injection of fluid according to multiple objectives or multiple control modes. Specifically, the present disclosure is directed to a method and apparatus to: (i) retrieve measured values (e.g., of pressure and/or flow rate) corresponding to an injected fluid; (ii) based on the retrieved measured values, select one of a plurality of control modes; and (iii) control the injection of the fluid based on the selected control mode. Controlling the injection according to each of the multiple control modes may include utilizing setpoints, control loop parameters, and functionality different from setpoints, control loop parameters, and functionality corresponding to the other control modes.

By pre-defining and utilizing multiple control modes, process control devices other than programmable logic controllers (PLCs) may consistently control an injection of a fluid. For example, one or more remote terminal units (RTUs) may control an injection of a fluid based on multiple control modes. In such a case, controlling the injection of the fluid would not necessitate a costly provision of AC power at the site of injection (e.g., at a wellhead). Rather, relatively low power sources, such as power sources relying on solar panels, may power the example RTUs.

In some implementations, the multiple control modes (e.g., utilized by an RTU) may include a primary objective control mode and an override objective control mode. In the primary objective control mode, a process control device may maintain/control a pressure and/or temperature within a reservoir based on a primary objective setpoint and one or more primary objective parameters configuring a control loop. In the override objective control mode, a process control device may reduce a pressure of an injected fluid to a level at or below a threshold based on an override objective setpoint and one or more override objective parameters configuring a control loop.

The multiple control modes may also include a no-flow control mode, in some implementations. In the no-flow control mode, a process control device may position one or more valves (e.g., coupled to a line through which an injected fluid travels) based on a no-flow setpoint and one or more no-flow parameters. For example, a no-flow control mode may "choke," or at least partially close, one or more valves as long as a flow rate of an injected fluid is below a threshold.

A process control device, such as an RTU, controlling injection of a fluid according to the multiple control modes may also include a control mode selector. This control mode selector may, based on measured values of a pressure and/or flow rate of an injected fluid, select one of the multiple control modes and cause the process control device to control the injected fluid based on the selected control mode. For example, the control mode selector may select one of a primary objective control mode, an override objective control mode, or a no-flow control mode.

Although RTUs will be referred to, by way of example, throughout the following description, some implementations of process control system may include process control devices other than RTUs, which process control devices are configured to control an injected fluid according to multiple control modes. For example, some implementations of process control devices may utilize specifically configured RTUs and/or specifically programmed PLCs. Generally, a process control system may utilize any combination and number of RTUs, PLCs, regulators, positioners, or other suitable computing devices configured to control an injection of a fluid using multiple control modes.

Further, the following description will, by way of example, refer to process control devices configured to control an injection of a fluid at wellhead, such as a wellhead at the surface of an oil or natural gas well. However, process control devices configured according to the present disclosure may control an injection of a fluid at any suitable injection point into any suitable well. For example, an RTU may control an injection of a fluid at any suitable injection point other than a wellhead and/or into any suitable reservoir other than an oil or natural gas reservoir, such as a reservoir of water, a sewage reservoir, reservoirs of fluids other than natural gas (e.g., liquid or gaseous oxygen, propane, etc.), etc. Moreover, a "reservoir," into which a fluid is injected as described herein, need not be a reservoir of a fluid. For example, an implementation of a process control system may cause fluid to be injected into a heap of mined ore (e.g., in a process known as "heap leaching") to saturate the mined ore with the injected fluid. Generally, reservoirs into which fluid is injected, according to multiple control modes, may be reservoirs of liquids, gases, or solids (ore, gravel, etc.).

The following description will also refer to water and steam as example fluids injected into a reservoir. However, implementations of process control systems utilizing the techniques of the present disclosure may inject fluids other than water and steam into reservoirs. For example, in a case in which an fluid is injected into a head of mined ore, the injected fluid may be an acid. Generally, injected fluids may include liquids, such as water, sulfuric acid, oil, chlorine, etc., or gases, such as oxygen, hydrogen, natural gas, ammonia, carbon dioxide, carbon monoxide, methane, acetylene, propane, etc.

Example Process Control System

Referring now to FIG. 1, a process control system 10 constructed in accordance with one version of the present disclosure is depicted incorporating one or more field devices 15, 16, 17, 18, 19, 20, 21, and 22 and one or more skids 30 and 31 in communication with a process controller 11. The process controller 11 may also communicate with one or more process control devices 35, 36, and 37, such as remote terminal units (RTUs), configured to control one or more of the field devices 15, 16, 17, 18, 19, 20, 21, and 22, and the example process controller 11 may communicate with a data historian 12 and one or more user workstations 13, each having a display screen 14. So configured, the controller 11 delivers signals to and receives signals from the field devices 15, 16, 17, 18, 19, 20, 21, and 22, the process control devices 35, 36, and 37, the skids 30 and 31, and the workstations 13 to control the process control system.

The process controller 11, the process control devices 35, 36, and 37, and/or components of the skids 30 and 31 may control an injection of a fluid (e.g., water or steam) at one or more wellheads 40, 41, 42, 43, 44, 45, and 46. In particular, the process controller 11, the process control devices 35, 36, and 37, and/or components of the skids 30 and 31 may control the injection of a fluid according to multiple control modes, such as a primary objective control mode, an override objective control mode, and a no-flow control mode. Although not shown in FIG. 1, the skids 30 and 31 may include field devices, process control devices (e.g., RTUs and/or PLCs), or other components. Further details of an example skid are discussed with reference to FIG. 2.

In additional detail, the process controller 11 of the process control system 10 of the version depicted in FIG. 1 is connected via hardwired communication connections to field devices 15, 16, 17, 18, 19, and 20, skid 30, and process control devices 35 and 36 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, and 20, skid 30, and process control devices 35 and 36 using a hardwired communication scheme which may include the use of any desired hardware, software, and/or firmware to implement hardwired communications. The hardwired communications may include, for example, standard 4-20 mA communications, and/or any communications using any smart communication protocol such as the FOUNDATION® Fieldbus communication protocol, the HART® communication protocol, etc. The field devices 15, 16, 17, 18, 19, and 20 and components of the skid 30 may include any types of devices, such as positioners, servo controllers, sensors, pressure regulators, control valve assemblies, etc., while the I/O cards 26 and 28 may be any types of I/O devices conforming to any desired communication or controller protocol. In particular, the field devices 15, 16, 17, 18, 19, and 20, the skid 30, and the process control devices 35 and 36 may communicate over analog lines (e.g., standard 4-20 mA) or over a digital bus (e.g., using Fieldbus protocol communications) to the I/O cards 26 and 28. Of course, the field devices 15, 16, 17, 18, 19, and 20, the skid 30, and the process control devices 35 may conform to any other desired standard(s) or protocols, including any standards or protocols developed in the future.

In addition, the process control system 10 depicted in FIG. 1 includes the field devices 21 and 22, the skid 31, and the process control device 37 that communicate wirelessly with the process controller 11. Wireless communications may be established between the controller 11 and the field devices 21 and 22, the skid 31, and the process control device 27 using any desired wireless communication equipment, including hardware, software, firmware, or any combination thereof now known or later developed. In the version illustrated in FIG. 1, an antenna 65 is coupled to and is dedicated to perform wireless communications for the skid 31, while the antenna 66 is coupled to and collectively handles wireless communications for the process control device 37, which process control device 37 is, in turn, communicatively coupled (e.g., via hardwired connections) to the field devices 21 and 22. The skid 31 and/or process control device 37 may implement protocol stack operations used by an appropriate wireless communication protocol to receive, decode, route, encode, and send wireless signals via the antennas 65 and 66 to implement wireless communications between the process controller 11 and the field devices 21 and 22, the skid 31, and the process control device 37. Further, although not shown, implementations of the process control system 10 may include any suitable numbers of modems, routers, or other wireless communication components coupled to the process control device 37 and/or skid 31, which modems, router, or other components may receive, decode, route, encode, and send wireless signals via the antennas 65 and 66.

The process controller 11 is coupled to one or more I/O devices 73 and 74, each connected to a respective antenna 75 and 76, and these I/O devices 73 and 74 and antennas 75 and 76 operate as transmitters/receivers to perform wireless communications with the field devices 21 and 22, the skid 31, and the process control device 37 via one or more wireless communication networks. The wireless communications may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode, and send wireless signals via the antennas 75 and 76 to implement wireless communications between the controller 11 and the field devices 21 and 22, the skid 31, and the process control device 37.

As illustrated in FIG. 1, the controller 11 conventionally includes a processor 77 that implements or oversees one or more process control routines (or any module, block, or sub-routine thereof) stored in a memory 78. The process control routines stored in the memory 78 may include or be associated with control loops being implemented within the process plant. As discussed further with reference to FIGS. 2 and 4, the process control devices 35, 36, and 37 and components of the skids 30 and 31 may also include similar processors and/or routines stored in memory. As such, control loops implemented within the process plant may be implemented by any suitable combination of the process controller 11, the process control devices 35, 36, and 37, and the skids 30 and 31, with the functionality of process control routines distributed in any suitable manner between the process controller 11, the process control devices 35, 36, and 37, and the skids 30 and 31. Generally speaking, the process controller 11, the process control devices 35, 36, and 37, and/or the skids 30 and 31 may execute one or more control routines and communicate with the field devices 15, 16, 17, 18, 19, 20, 21, and 22, the user workstations 13, and the data historian 12 to control a process in any desired manner(s).

Example Skid

Figure 2:
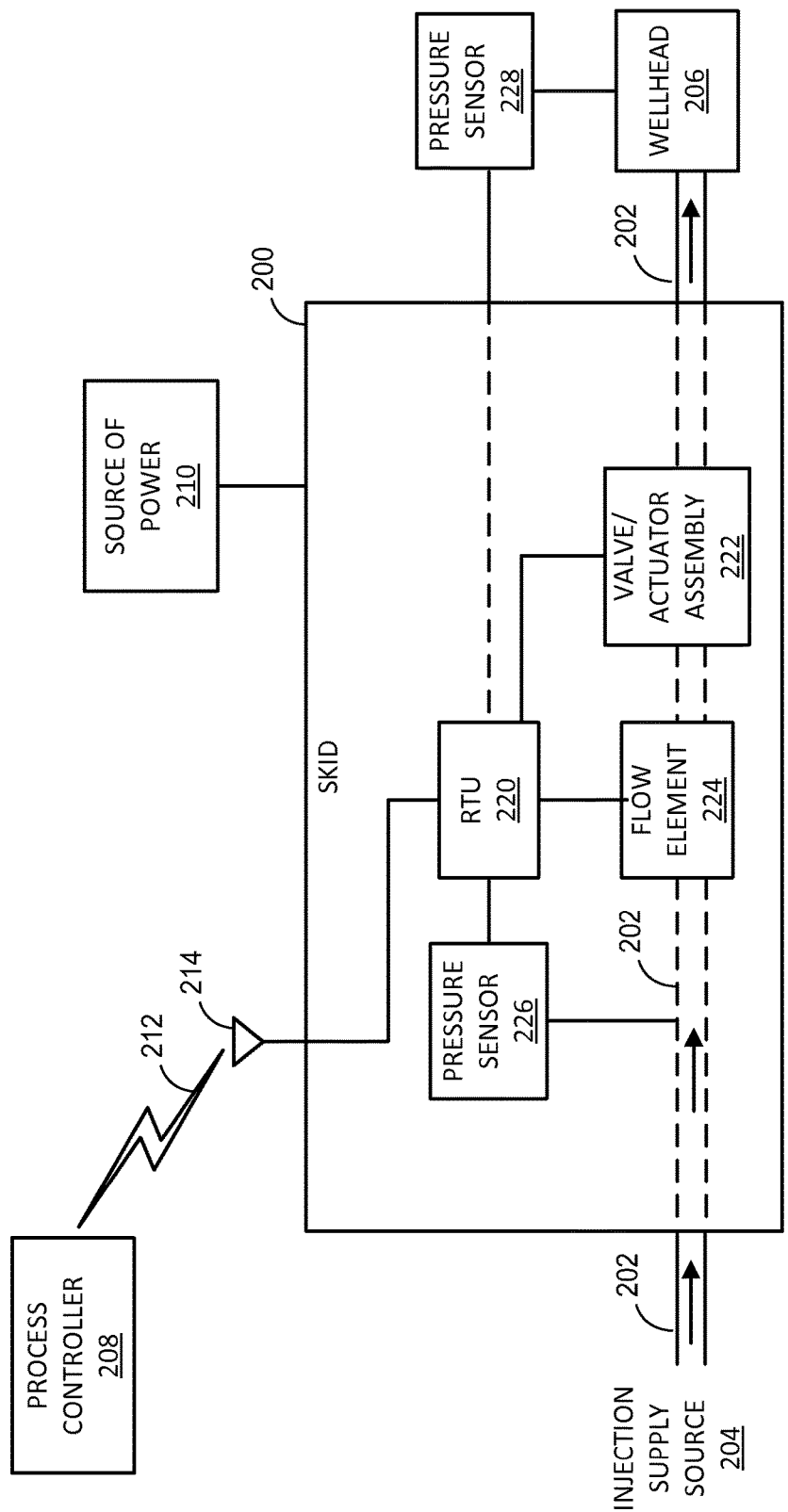
FIG. 2 is a block diagram of an example skid which may be implemented in the process control system illustrated in FIG. 1.

FIG. 2 illustrates an example skid 200. The process control system 10 may implement the example skid 200 as one of the skids 30 and 31, for example. Generally, the skid 200 may be a pre-fabricated station designed to a certain customer's specifications (e.g., the specification of an operator of an oil or gas well) and built to order. The skid 200 may include any number and types of components according to the specifications of the skid 200. Certain components and functionality of the example skid 200 are discussed below. However, a skid, which may be implemented in the example process control system 10 and may be specifically configured according to the techniques discussed herein, may include components other than those discussed below and may be customized in any suitable manner for a particular installation or application.

As illustrated in FIG. 2, the example skid 200 may be physically coupled to a line 202, such as a pipe, through which a fluid flows. The fluid (e.g., water or steam) may be supplied by an injection supply source 204, and a suitable combination of components of the skid 200 and a process controller 208 may control an injection of the fluid into a wellhead 206. Although illustrated in FIG. 2 as being somewhat close, the skid 200, the wellhead 206, the injection supply source 204, and the process controller 208 need not be physically close to allow the skid 200 and/or process controller 208 to control an injection of the fluid into the wellhead 206. In fact, many implementations of the skid 200 may include a placement of the skid 200 hundreds of feet, thousands of feet, or even miles from the wellhead 206, the injection supply source 204, and/or the process controller 208.

A source of power 210 may power some or all of the components of the skid 200. To this end the source of power 210 may provide, via one or more electrical connections (e.g., wires or cables), certain current and/or voltage values to components of the skid 200 such that the components are able to operate. In some implementations, the source of power 210 may power the skid 200 at relatively low powers in comparison to AC power (e.g., mains power) utilized to power other devices such as PLCs. Further, the source of power 210 may supply power to the skid from power generators, such as power generators utilizing solar panels or wind turbines to generate power. In this manner, operators of a process control system, such as the process control system 10, may install both the skid 200 and the source of power 210 at any number of locations along the line 202, such as near the wellhead 206, without being restricted by a requirement for mains power. That is, the skid 200 and the source of power 210 may be portable and/or modular.

To further provide portability of the skid 200 and ease of installation, some implementations of the skid 200 may communicate with the process controller 208 via wireless signals 212. For example, the skid 200 may send and/or receive the wireless signals 212 via an antenna 214. Although FIG. 2 illustrates this type of wireless communication, some skids may communicate with process controllers via hardwired connections and/or via one or more intermediate devices, such as modems, routers, gateways, etc.

The example skid 200 may include a remote terminal unit (RTU) 220, a valve/actuator assembly 222, a flow element 224, and a pressure sensor 226. The RTU 220 may generate and send command signals to the valve/actuator assembly 222 based, at least partially, on measured pressure and flow values from the pressure sensor 226 and the flow element 224 and/or based on the wireless signals 212. These command signals may cause the valve/actuator assembly 222 to operate (e.g., open, close, or travel some relative distance) so as to control a pressure and/or flow rate of the fluid injected into the wellhead 206. The command signals may include any suitable combination of analog (e.g., 4-20 mA) or digital (e.g., WirelessHART® or HART® encoded) signals depending on the communication capabilities and/or configuration of the valve/actuator assembly 222. Further details of an example RTU that may be implemented as the RTU 220 are discussed with reference to FIG. 4, and further details of example methods for controlling an injection of a fluid (e.g., by the RTU 220) are discussed with reference to FIGS. 5-9.

The pressure sensor 226 may include any suitable gauge and/or atmospheric pressure transmitters configured to transmit a pressure of the fluid to the RTU 220. The flow element 224 may include vortex flowmeters, magnetic flowmeters, coriolis flowmeters, differential pressure flowmeters, and/or any other suitable meters, sensors, or elements configured to measure a flow rate of the fluid through the line 202. Although FIG. 2 illustrates both the pressure sensor 226 and the flow element 224 being disposed upstream (e.g., closer to the injection supply source 204) from the valve/actuator assembly 222, some implementations of skids may include RTUs that are communicatively connected to pressure sensors and/or flow elements downstream from the valve/actuator assembly 222. In particular, the example RTU 220 may receive indications of pressures at the wellhead 206 from a downstream pressure sensor 228. Generally, a skid, or RTU included on/in a skid, may communicate with any number of pressure sensors and flow elements upstream and any number of pressure sensors and flow elements downstream of a controlled valve/actuator assembly.

Figure 3:
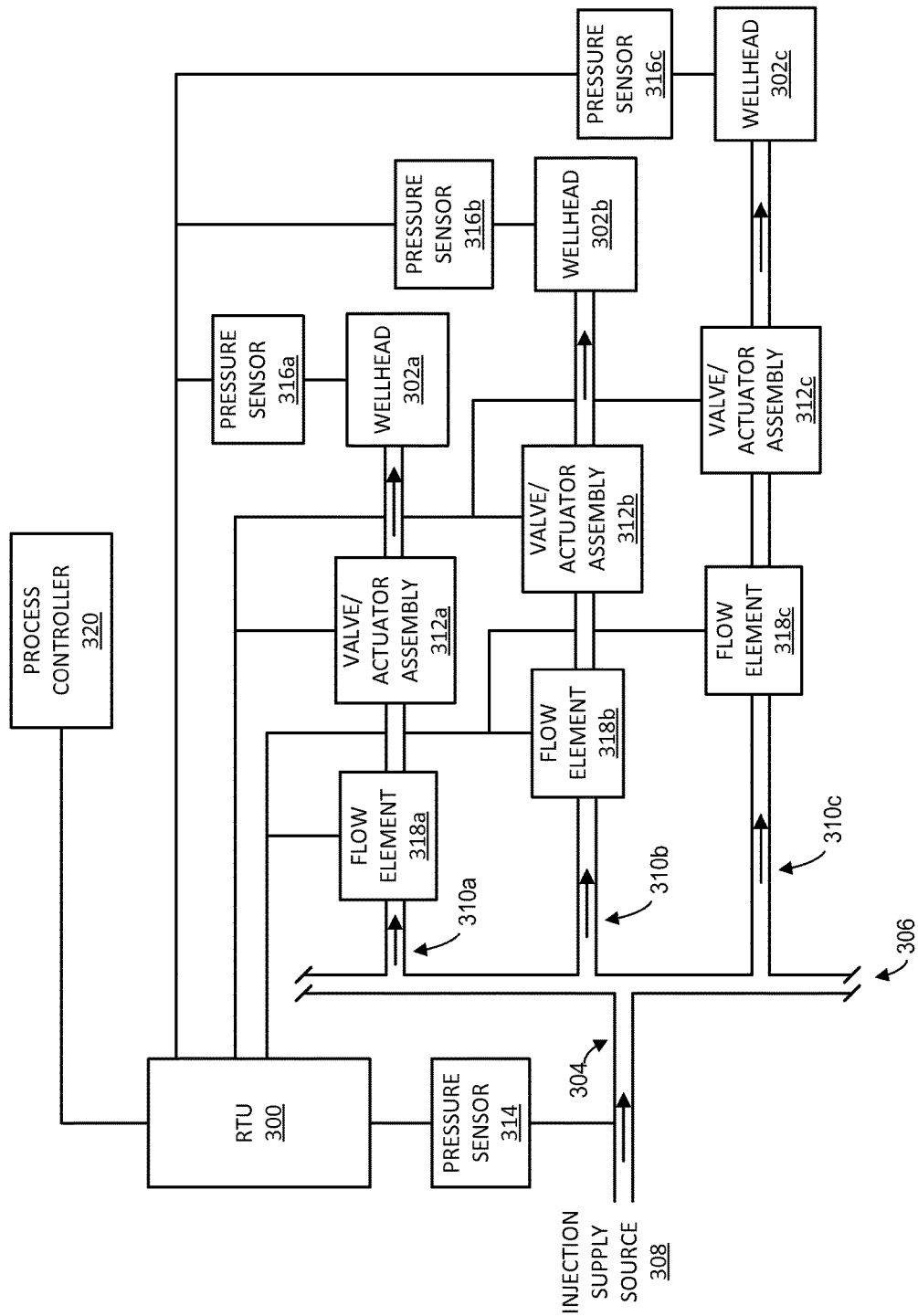
FIG. 3 is a block diagram of an example remote terminal unit (RTU) controlling an injection of a fluid at multiple wellheads.

Example Process Control Device Controlling Injection of a Fluid at Multiple Wellheads FIG. 3 illustrates a process control device, the RTU 300, controlling an injection of a fluid at multiple wellheads 302a, 302b, and 302c. The process control system may implement the example RTU 300 as one of the process control devices 36 and 37, for example. The RTU 300 may be disposed near or coupled to a supply line 304 at a header 306, in an implementation, where the fluid travels through the supply line 304 from an injection supply source 308 to the header 306. Multiple injection lines 310a, 310b, and 310c may then distribute the fluid to the multiple wellheads 302a, 302b, and 302c, respectively.

Although one supply line 304, one header 306, one RTU 300, three injection lines 310a, 310b, and 310c, and three wellheads 302a, 302b, and 302c are illustrated in FIG. 3, some implementations of process control systems may include other numbers and combinations of supply lines, headers, RTUs, injection lines, and wellheads. For example, a single header may supply fluid to two or more than three wellheads, and, in another example, multiple (two, three, four, etc.) headers, each associated with a separate RTU, may supply multiple wellheads with fluid for injection at the wellheads.

The RTU 300 may generate and send command signals to valve/actuator assemblies 312a, 312b, and 312c. The RTU 300 may generate these command signals based, at least partially, on measured pressure and flow values from the pressure sensors 314, 316a, 316b, and 316c and the flow elements 318a, 318b, and 318c and/or based on signals from a process controller 320. These command signals may cause the valve/actuator assemblies 312a, 312b, and 312c to operate (e.g., open, close, or travel some relative distance) so as to control a pressure and/or flow rate of the fluid injected into the wellheads 302a, 302b, and 302c. The command signals may include any suitable combination of analog (e.g., 4-20 mA) or digital (e.g., WirelessHART® or HART® encoded) signals depending on the communication capabilities and/or configuration of the valve/actuator assemblies 302a, 302b, and 302c. Further details of an example RTU, that may be implemented as the RTU 300, are discussed with reference to FIG. 4, and further details of example methods for controlling an injection of a fluid (e.g., by the RTU 300) are discussed with reference to FIGS. 5-9.

The pressure sensors 314, 316a, 316b, and 316c and the flow elements 318a, 318b, and 318c may be similar to those sensors and flow elements discussed with reference to FIG. 2. In this case, the "upstream" pressure sensor 314 may be configured to detect a pressure of the fluid in the supply line 304 or the header 306, as opposed to detecting pressures upstream from the valve/actuator assemblies 312a, 312b, and 312c in the injection lines 310a, 310b, and 310c. Generally, however, one or more pressure sensors may detect pressures of the fluid in supply lines, injection lines, and headers at points upstream from controlled valve/actuator assemblies.

Example Remote Terminal Unit

Figure 4:
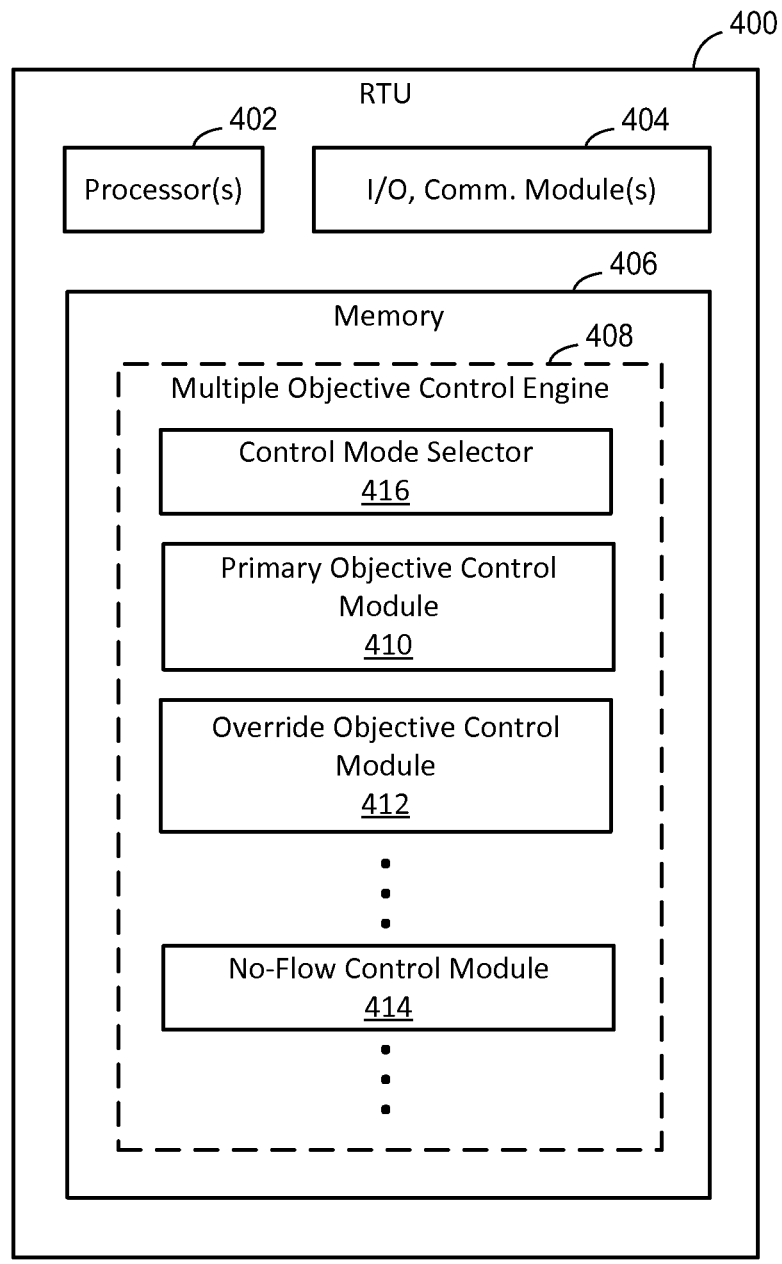
FIG. 4 is a block diagram of an example RTU that may be implemented as one of the process control devices illustrated in FIG. 1.

FIG. 4 is a block diagram of an example remote terminal unit (RTU) 400 that may control an injection of a fluid according to multiple control modes. The RTU 400 may be implemented as one of the process control devices 35, 36, or 37 or as a component of one of the skids 30 and 31, for example. Although an example RTU 400 is described below and illustrated in FIG. 4, some implementations of process control systems may implement multiple control modes via any suitable combination of RTUs and other process control devices.

The example RTU 400 includes one or more processor(s) 402, one or more Input/Output (I/O) or communications module(s) 404, and a non-transitory memory 406. A system bus of the RTU 400 may couple the one or more processor(s) 402 to the Input/Output (I/O) or communications module(s) 404 and the non-transitory memory 406. For example, a system bus coupling these components may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The non-transitory memory 406 may include any non-transitory media that may be accessed by the RTU 400. By way of example, and not limitation, the non-transitory memory 406 may include random-access memory (RAM), read-only memory (ROM), electrically erasable programmable ROM (EEPROM), optical storage disks, magnetic storage devices, and/or any other non-transitory medium which may be used to store information accessible by a computing device, such as the RTU 400.

The non-transitory memory 406 may store information including computer-readable instructions, program modules, data structures, or other data, such as control logic, control loop parameters, and/or other information facilitating the control of an injected fluid. In particular, the example non-transitory memory 406 may include a multiple objective control engine 408 specifically, or specially, configuring the RTU 400 such that, when executed by the processor(s) 402, the multiple objective control engine 408 causes the RTU 400 to control an injected fluid based on multiple control modes. The multiple objective control engine 408 may include multiple control modules, where each of the multiple control modules causes the RTU 400 to control the injection of a fluid (e.g., a pressure and/or flow rate of the fluid) based on a corresponding control mode. In the implementation illustrated in FIG. 4, the multiple objective control engine 408 includes a primary objective control module 410, an override objective control module 412, and a no-flow control module 414. To select which of these modules 410, 412, and 414 is to control the injection of the fluid, the multiple objective control engine 408 may also include a control mode selector 416.

When selected, activated, or enabled (e.g., by the control mode selector 416), the primary objective control module 410 may cause the RTU 400 to control a pressure and/or flow rate of an injected fluid according to a "primary objective." This primary objective may, by way of example, define various parameters of control logic (e.g., implemented in the primary objective control module 410), such as proportional, integral, or derivative (PID) parameters or setpoints of a PID control loop mechanism. Using and/or implementing such definitions, the primary objective control module 410 may control a pressure and/or flow rate of an injected fluid such that a measured pressure and/or flow rate is adjusted to a primary objective setpoint (within a certain tolerance). For example, the primary objective control module 410 may, when selected by the control mode selector 416 and executed by the processor(s) 402, control a pressure of an injected fluid such that a measured reservoir pressure within a reservoir (e.g., an oil reservoir) is maintained, where the injected fluid is injected into the reservoir.

When selected, activated, or enabled (e.g., by the control mode selector 416), the override objective control module 412 may cause the RTU 400 to control a pressure and/or flow rate of an injected fluid according to an "override objective." This override objective may, by way of example, define various parameters of control logic (e.g., implemented in the primary objective control module 410), such as proportional, integral, or derivative (PID) parameters or setpoints of a PID control loop mechanism. The parameters defined by the override objective may be different than those defined by the primary objective. That is, the primary objective control module 410 may be configured with different parameters, settings, etc. than the override objective control module 412, such as different PID parameters and setpoints. As such, the override objective control module 412 controls an injected fluid differently than the primary objective control module 410. In some implementations, the override objective control module 412 may control a pressure of an injected fluid to lower the pressure to a level at or below a threshold.

When selected, activated, or enabled (e.g., by the control mode selector 416), the no-flow control module 414 may cause the RTU 400 to control one or more valves, or other field devices, when a flow rate of an injected fluid drops below a certain threshold. To this end, the no-flow control module 414 may operate based on parameters and/or setpoints different from those associated with the primary objective control module 410 and the override objective control module 412. For example, the no-flow control module 414 may "choke" (e.g., partially close) certain valves when a flow rate of an injected fluid drops below a threshold. In this manner, the example no-flow control module 414 may prevent pressure, flow, or other surges when an offline source of injected fluid comes back online.

The control mode selector 416 may select one of these control modes (e.g., control according to one of the modules 410, 412, and 414) automatically based on measured values of pressure and/or flow rate or based on manual instructions from a process controller, human operator of a process control system, or other suitable entity. In some implementations, the RTU 400 may receive (e.g., via the I/O or communication module 404) measured pressure and/or flow rates from pressure sensors and/or flow elements, respectively, upstream and/or downstream from a control valve/actuator assembly. The control mode selector 416 may determine if these received values meet certain conditions associated with each of the control modes, or modules 410, 412, and 414. If the conditions are met for one or more of the modules 410, 412, and 414, the control mode selector 416 may select the one or more modules 410, 412, and 414 and cause the RTU 400 to execute the selected one or more modules 410, 412, and 414. For example, if a flow rate is below a threshold, the control mode selector 416 may select the no-flow control module 414, or, if a pressure is above a threshold, the control mode selector 416 may select the override objective control module 412. Such selections are further discussed with reference to FIG. 6.

Although FIG. 4 illustrates three modules 410, 412, and 414 corresponding to three different selectable control mode (i.e., primary objective, override objective, and no-flow control), RTUs and/or other process control devices implementing control based on multiple control modes may utilize other numbers and combinations of modules implementing other numbers of control modes. For example, an RTU may implement a control mode selector that selects from four, five, six, etc. different modules, each module corresponding to a different control mode configured according to different control logic. Further, some control modes may be implemented (e.g., within an RTU) by multiple modules, algorithms, routines, or engines. For example, the functionality of a primary objective control module may be split be two, three, four, etc. different modules, routines, algorithms, etc. within a memory of an RTU.

The I/O or communications module 404 of the RTU 400 may facilitate analog and/or digital and wired and/or wireless communications between the RTU 500 and process controllers, field devices (e.g., valve actuator assemblies), and/or one or more networks. Logical connections between the RTU 400 and one or more remote device may include one or more wireless communication networks, such as networks facilitating communication according to the WirelessHART® protocol, the Ember protocol, a WiFi protocol, an IEEE wireless standard, etc., and one or more wired communication networks, such as networks facilitating 4-20 mA communications, communications adhering to the FOUNDATION® Fieldbus communication protocol or the HART® communication protocol, communications over an Ethernet network, etc. However, as may be appreciated, other means of establishing a communications link between the RTU 400 and a remote device may be utilized.

In some implementations, the RTU 400 may be modular. That is, the components of the RTU 400, such as the I/O or communications module 404, the processor(s) 402, and/or the non-transitory memory 406, may be separable modules coupled together to form the RTU 400 such that the RTU 400 has certain functionality. For example, the RTU 400 may have a "backplane" that couples to central processing unit (CPU) or processor modules, power input modules, communication modules, and I/O modules. In this manner, some implementations of the RTU 400 may be expandable and may include any number of modules and/or components in addition to the components discussed above. Further, at least some of the components depicted in FIG. 4 may be split between modules of the RTU 400 in any suitable manner.

Example Methods for Controlling an Injected Fluid with Multiple Control Modes

Figure 5:
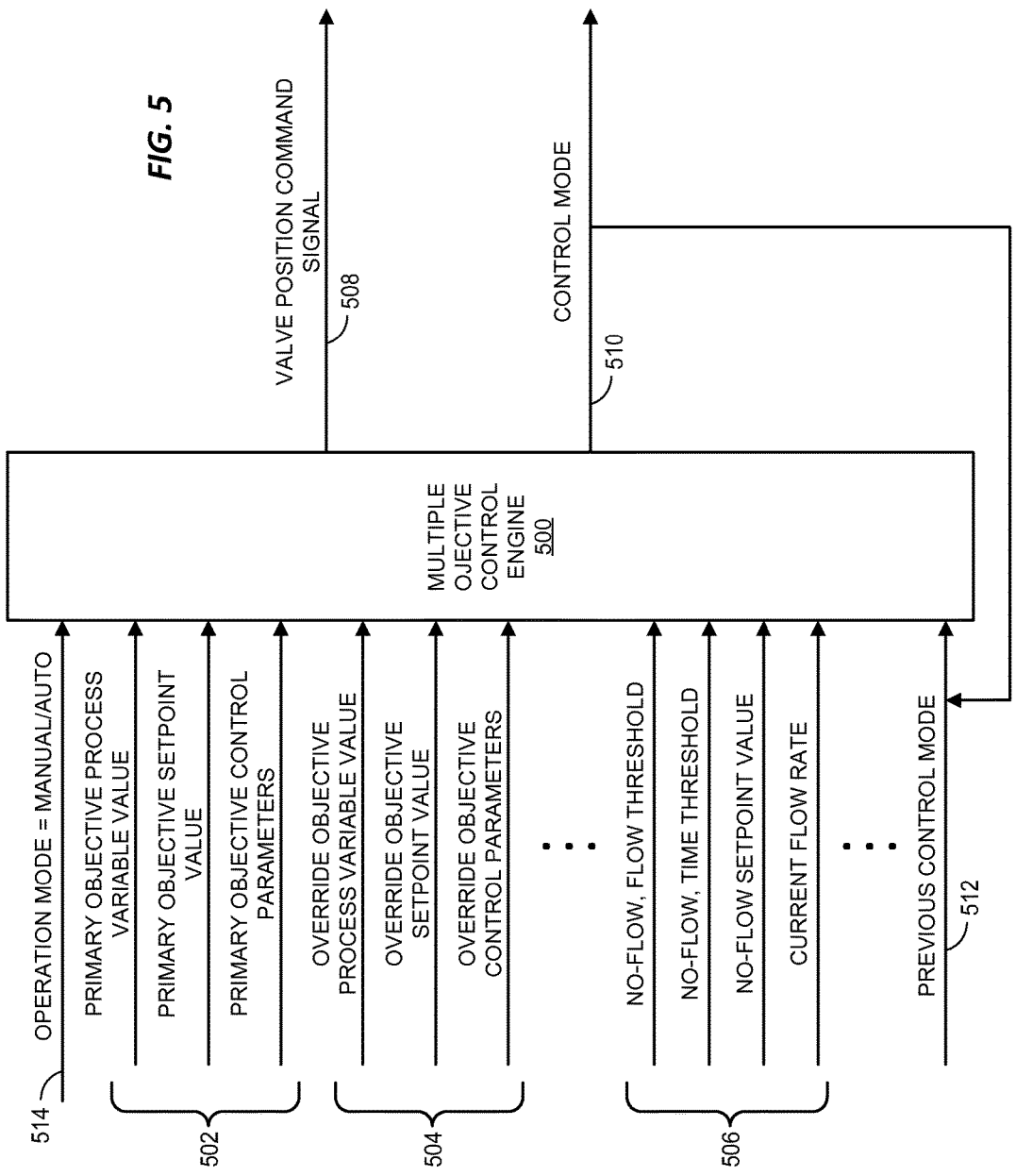
FIG. 5 illustrates an example flow of inputs into and outputs out of a multiple objective control engine which may be implemented in the RTU illustrated in FIG. 4.

FIG. 5 illustrates an example flow of inputs into and outputs out of a multiple objective control engine 500. The RTU 400 may implement the example multiple objective control engine 500 as the multiple objective control engine 408, for example.

The example multiple objective control engine 500 may receive parameters and values 502 associated with a primary objective control mode and/or a primary objective control module, parameters and values 504 associated with an override objective control mode and/or an override objective control module, and parameters and values 506 associated with a no-flow control mode and/or a no-flow control module. The multiple objective control engine 408 may control a pressure and/or flow rate of an injected fluid according to the parameters and values 502, 504, and 506 when a control mode selector of the multiple objective control engine 500 selects a primary objective control mode, an override objective control mode, and a no-flow control mode, respectively.

Regardless of the selected control mode, the example multiple objective control engine 500 may produce, as output, a valve position command signal 508 and, optionally, an indication of a selected control mode 510. As discussed already with reference to FIGS. 2 and 3 and as discussed below with reference to FIGS. 6, 7, 8, and 9, an RTU, such as the RTU 400, may communicate the valve position command signal 508 to a valve/actuator assembly to cause the valve/actuator assembly to operate such that a pressure and/or flow rate of an injected fluid is controlled. The indication of the selected control mode 510 may indicate which of a primary objective control mode, an override objective control mode, and a no-flow control mode were utilized to produce the valve position command signal 508, which primary objective control mode, override objective control mode, and no-flow control mode correspond to the parameters and values 502, 504, and 506, respectively.

In some implementations, the multiple objective control engine 500 may also receive, as input, an indication of a previously selected control mode 512. The example multiple objective control engine 500 may utilize such an indication in selecting (e.g., by a control mode selector) a control mode for a next control "interval," as further discussed with reference to FIG. 6. In a scenario in which there was no previously selected control mode (e.g., upon initiating control of an injected fluid), the multiple objective control engine 500 may utilize a default or initial control mode, which control mode was pre-determined, for example.

Further, the multiple objective control engine 500 may receive, in some implementations, an indication of a manual or automatic operation mode 514. This indication 514 may be generated and communicated by a process controller or a human operator of an RTU. For example, a human operator of an RTU, such as the RTU 400, may interact with a button, touchscreen, switch, or other interface to set an operation mode of the RTU to manual or automatic. In another example, a routine of a process controller or a human interacting with a process controller may, via the process controller, set an operation mode of an RTU to manual or automatic. If the indication 514 indicates an automatic operation mode, the multiple objective control engine 500 may automatically select a control mode and generate the valve position command signal 508 based on the selected control mode. If the indication 514 indicates a manual operation mode, the multiple objective control engine 500 may only utilize a control mode manually selected by an operator or process controller, in an implementation.

Figure 6:
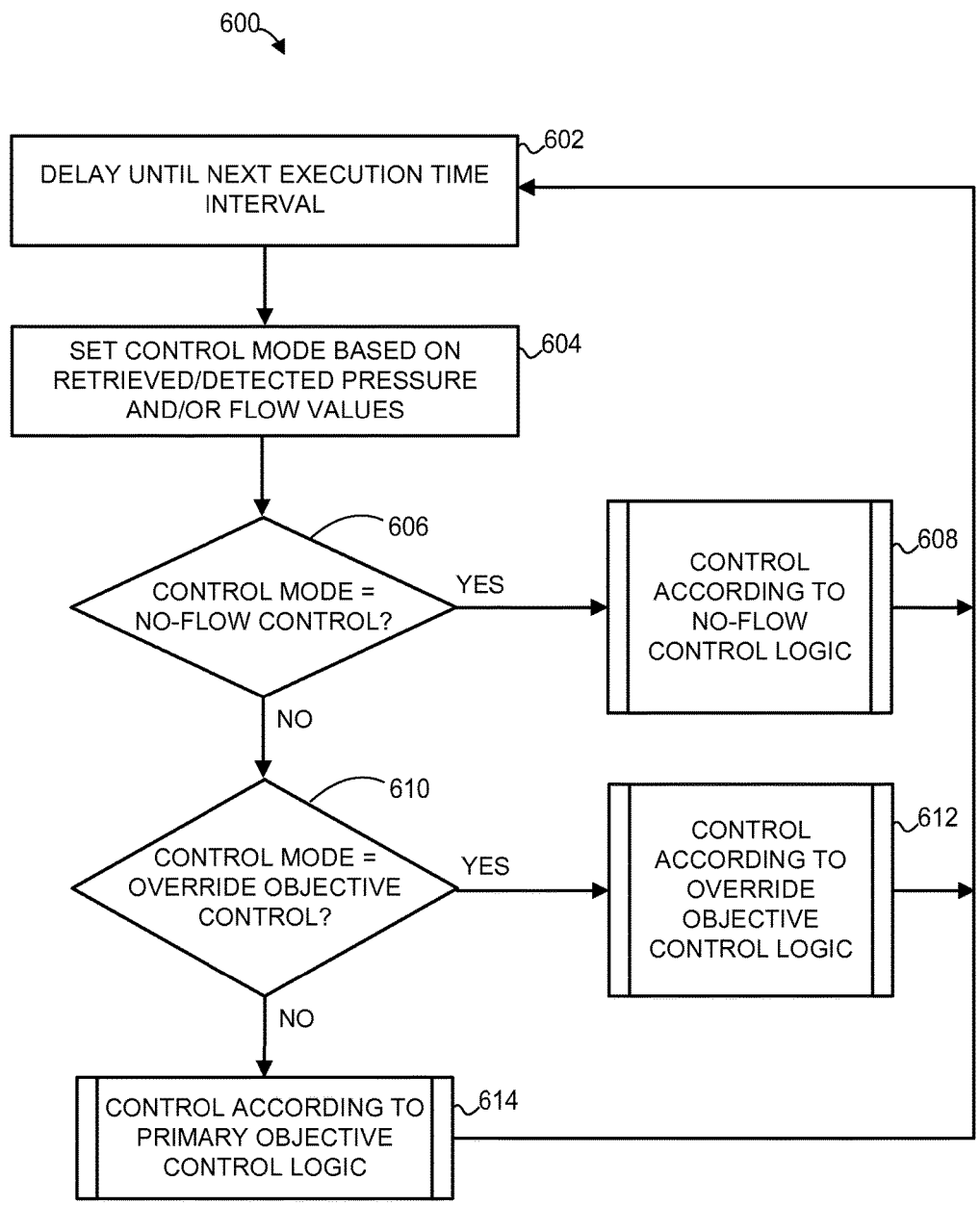
FIG. 6 is a flow diagram of an example method for controlling the injection of a fluid according to multiple control modes which may be implemented by the RTU illustrated in FIG. 4.

FIG. 6 is a flow diagram of an example method 600 for controlling an injected fluid according to multiple control modes. The method 600 may be implemented by one of the RTUs 35, 36, 37, 220, 300, or 400, for example. For ease of discussion, components of the example RTU 400 are referred to below. However, any suitable process control devices or combination of process control devices may implement the functionality discussed with reference to method 600.

In the method 600, after delaying for an interval of time (block 602), a control mode is set based on received values of pressure and/or flow rate (block 604). For example, some process control devices, such as the RTU 400, may control a pressure and/or flow rate of an injected fluid during pre-determined, or otherwise determined, time intervals, such as intervals of ten second, thirty seconds, one minute, half an hour, etc. During each of these time intervals, the RTU 400 may control the pressure and/or flow rate using a selected one of multiple control modes. After each one of these time intervals (block 602), a subsequent control mode may be selected for the next time intervals.

In some implementations, a set of control modes, from which a control mode is selected, may include a primary objective control mode, an override objective control mode, and a no-flow control mode. The RTU 400 may utilize the primary objective control mode to control a pressure of an injected fluid such that a reservoir pressure within a reservoir is maintained, and the RTU 400 may utilize the override objective control mode to reduce a pressure of the injected fluid to a level at or below a threshold (e.g., when the RTU 400 detects that the pressure is above the threshold). Further, the RTU may utilize a no-flow control mode to control one or more valve/actuator assembly when a flow rate of an injected fluid drops below a threshold.

Because these example control modes may be configured to control an injected fluid under certain conditions, the control mode may be set, selected, or enabled, at block 604 of the method 600, by determining if a current or recent pressure and/or flow rate of an injected fluid meets certain conditions. For example, the control mode selector 416 may analyze measured values of pressure and/or flow rate (e.g., received via the I/O and communication module(s) 404) to determine if: (i) a pressure of an injected fluid is above one or more threshold values; and (ii) a flow rate of an injected fluid is below one or more thresholds. If the first condition (i) is met, the control mode selector 416 may set the control mode to be an override objective control mode. If the second condition (ii) is met, the control mode selector 416 may set the control mode to be a no-flow control mode. In some implementations, one of these determinations (i) or (ii) may be given priority over the other such that, if both conditions are met, the control mode is set based on the prioritized one of the determinations (i) or (ii). If neither of these conditions are met, in an implementation, the control mode may be set to the primary objective control mode.

The example method 600 further includes determining if the control mode is set to a no-flow objective control mode (block 606). If the control mode is set to a no-flow control mode, or if the no-flow control mode is enabled or selected, the flow of method 600 continues to block 608 where a valve/actuator assembly is controlled according to the no-flow control mode. Further details of an example method for controlling according to a no-flow control mode are discussed with reference to FIG. 9. On the other hand, if the control mode is not set to a no-flow control mode, the flow of method 600 continues to block 610.

At block 610, the RTU 400 may determine if an override objective control mode is set, selected, or enabled (block 610). If the control mode is set to an override objective control mode, the flow of method 600 continues to block 612 where a pressure of an injected fluid is controlled according to the override objective control mode. Further details of an example method for controlling according to an override objective control mode are discussed with reference to FIG. 8. On the other hand, if the control mode is not set to an override objective control mode, the flow of method 600 continues to block 614. At block 614, the RTU 400 may control a pressure of an injected fluid according to a primary objective control mode. Further details of an example method for controlling according to a primary objective control mode are discussed with reference to FIG. 7.

Figure 7:
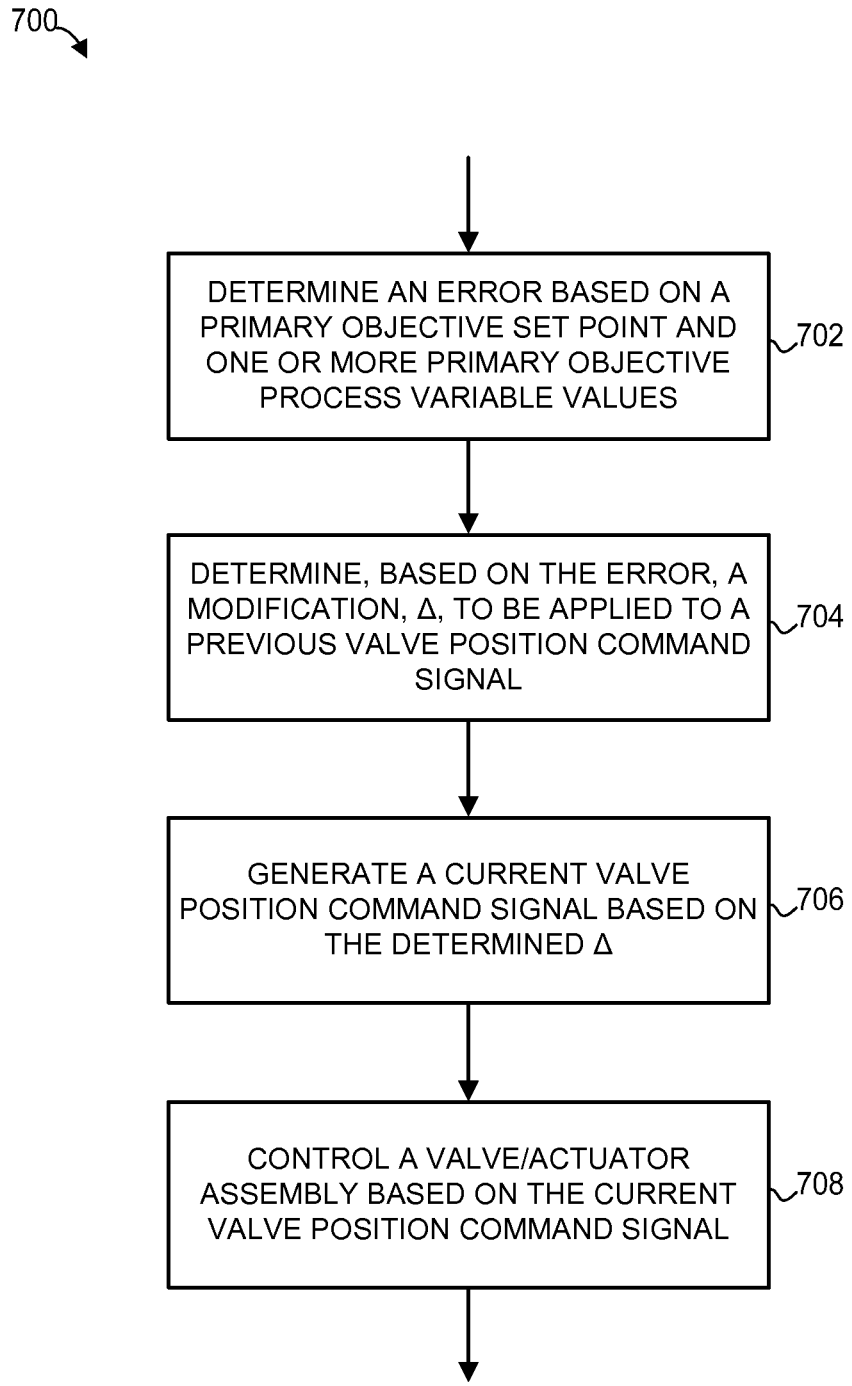
FIG. 7 is a flow diagram of an example method for controlling the injection of a fluid according to a primary objective control mode.

FIG. 7 is a flow diagram of an example method 700 for controlling a pressure of an injected fluid according to a primary objective control mode. The method 700 may be implemented by one of the RTUs 35, 36, 37, 220, 300, or 400, for example. Specifically, the primary objective control module 410 of the RTU 400 may implement at least some of the functionality discussed with reference to the method 700. For ease of discussion, components of the example RTU 400 are referred to below. However, any suitable process control devices or combination of process control devices may implement the functionality discussed with reference to method 700.

In the example method 700, the primary objective control module 410 may determine an error between one or more primary objective process variable values and corresponding primary objective setpoints (block 702). The one or more primary objective process variable values may be measured values of pressure, flow rate, and/or any other suitable measured values of an injected fluid. The primary objective control module 410 may receive the primary objective setpoints from a process controller or from a human operator/user of a process control system, or the primary objective control module 410 may determine the setpoints to control a pressure of an injected fluid such that a reservoir pressure is maintained. The primary objective control module 410 may determine the error between the one or more primary objective process variable values and corresponding primary objective setpoints by subtracting values, transforming values, squaring values, summing values, etc.

The example method 700 may also include determining, based on the error, a modification, $\Delta$, to be applied to a previous valve position command signal (block 704). This modification, when applied to the previous valve position command signal, produces a new valve position command signal which causes a valve/actuator assembly to operator so as to adjust a pressure and/or flow rate of an injected fluid. The primary objective control module 410 may generate the modification based on various accumulated, dynamically determined, and/or pre-determined parameters of a PID controller algorithm. For example, the primary objective control module 410 may combine (e.g., sum, average, etc.) the error along with other proportion, integral, and derivative terms of a PID controller algorithm to generate the modification $\Delta$. Once the modification $\Delta$ is generated, the primary objective control module 410 may apply the modification $\Delta$ to generate a current or new valve position command signal (block 706).

The primary objective control module 410, or other suitable module of the RTU 400, may utilize the generated valve position command signal to control one or more valve/actuator assemblies (block 708). For example, the primary objective control module 410 may transfer an indication of the generated valve position command signal to the I/O and communication module(s) 404, and the I/O and communication module(s) 404 may communicate the generated valve position command signal to one or more valve/actuators assemblies to cause the one or more valve/actuators assemblies to operate based on the generated valve position command signal.

Figure 8:
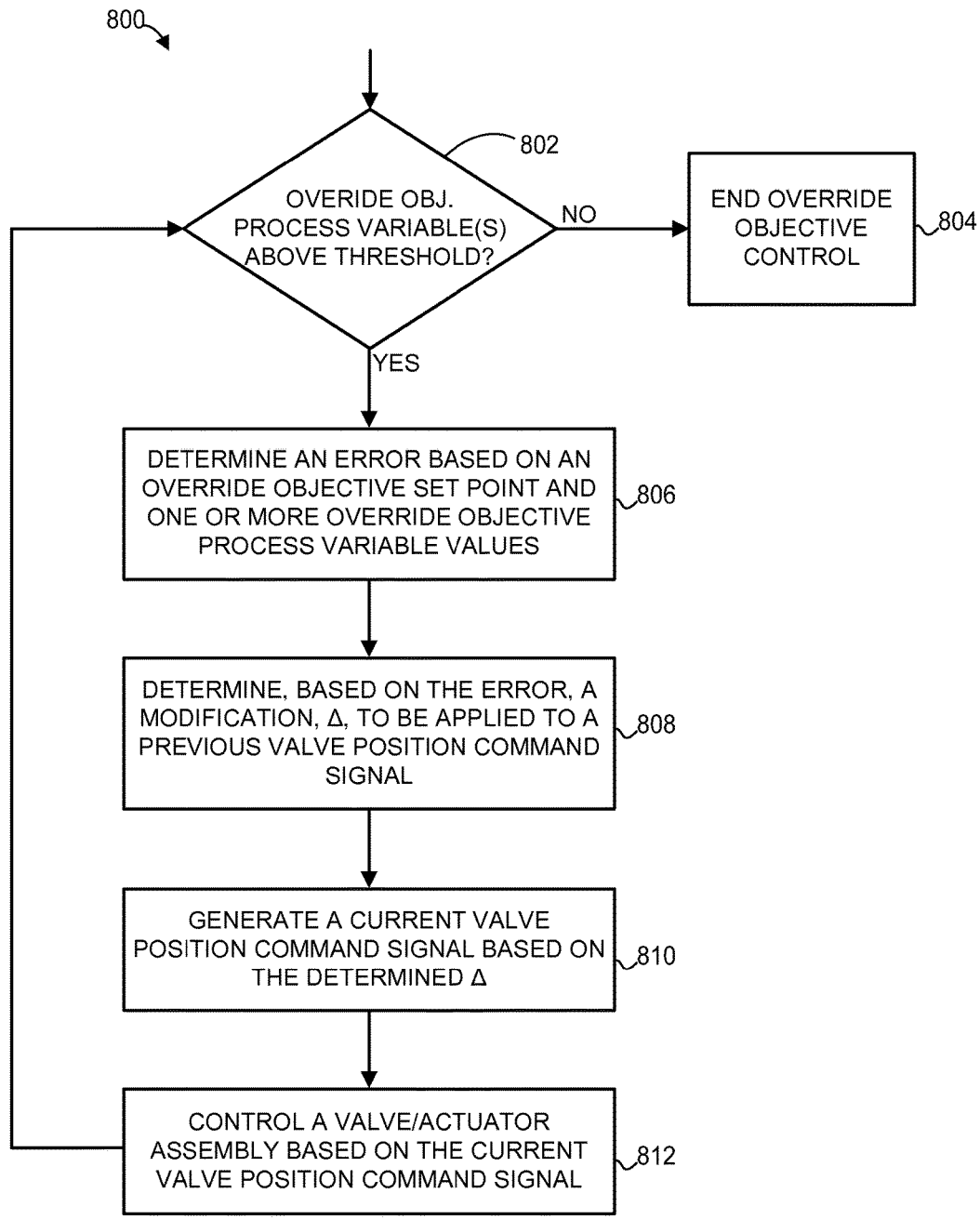
FIG. 8 is a flow diagram of an example method for controlling the injection of a fluid according to an override objective control mode.

FIG. 8 is a flow diagram of an example method 800 for controlling a pressure of an injected fluid according to an override objective control mode. The method 800 may be implemented by one of the RTUs 35, 36, 37, 220, 300, or 400, for example. Specifically, the override objective control module 412 of the RTU 400 may implement at least some of the functionality discussed with reference to the method 800. For ease of discussion, components of the example RTU 400 are referred to below. However, any suitable process control devices or combination of process control devices may implement the functionality discussed with reference to method 800.

In the example method 800, the override objective control module 412 may determine if one or more override objective process variables are above one or more thresholds (block 802). In some implementations, the override objective control module 412 may utilize a threshold for pressure of an injected fluid, where the threshold defines an maximum pressure. The override objective control module 412 may control a pressure of the injected fluid such that it is reduced and/or maintained below this threshold. In such cases, the override objective control module 412 compare a measured pressure value of the injected fluid to the threshold to determine if the measured pressure value is above the threshold. If the measured pressure value is not above the threshold, the flow of method 800 may continue to block 804 where override objective control ends. However, if the measured pressure value is above the threshold, the flow of method 800 may continue to block 806.

At block 806, the override objective control module 412 may determine an error between the one or more override objective process variable values (e.g., pressure values) and corresponding override objective setpoints (block 702). Both the one or more override objective process variables (e.g., pressure) and the override objective setpoints may be different from primary objective variables and/or primary objective setpoints. However, similar to the functionality discussed with reference to FIG. 7, the override objective control module 412 may determine the error between the one or more override objective process variable values and corresponding override objective setpoints by subtracting values, transforming values, squaring values, summing values, etc. Also, similar to the functionality discussed with reference to FIG. 7, the override objective control module 412 may determine a modification to be applied to a previous valve command signal (block 808), generate a new valve command signal based on the modification (block 810), and control a valve/actuator assembly using the generated valve command signal (block 812).

Figure 9:
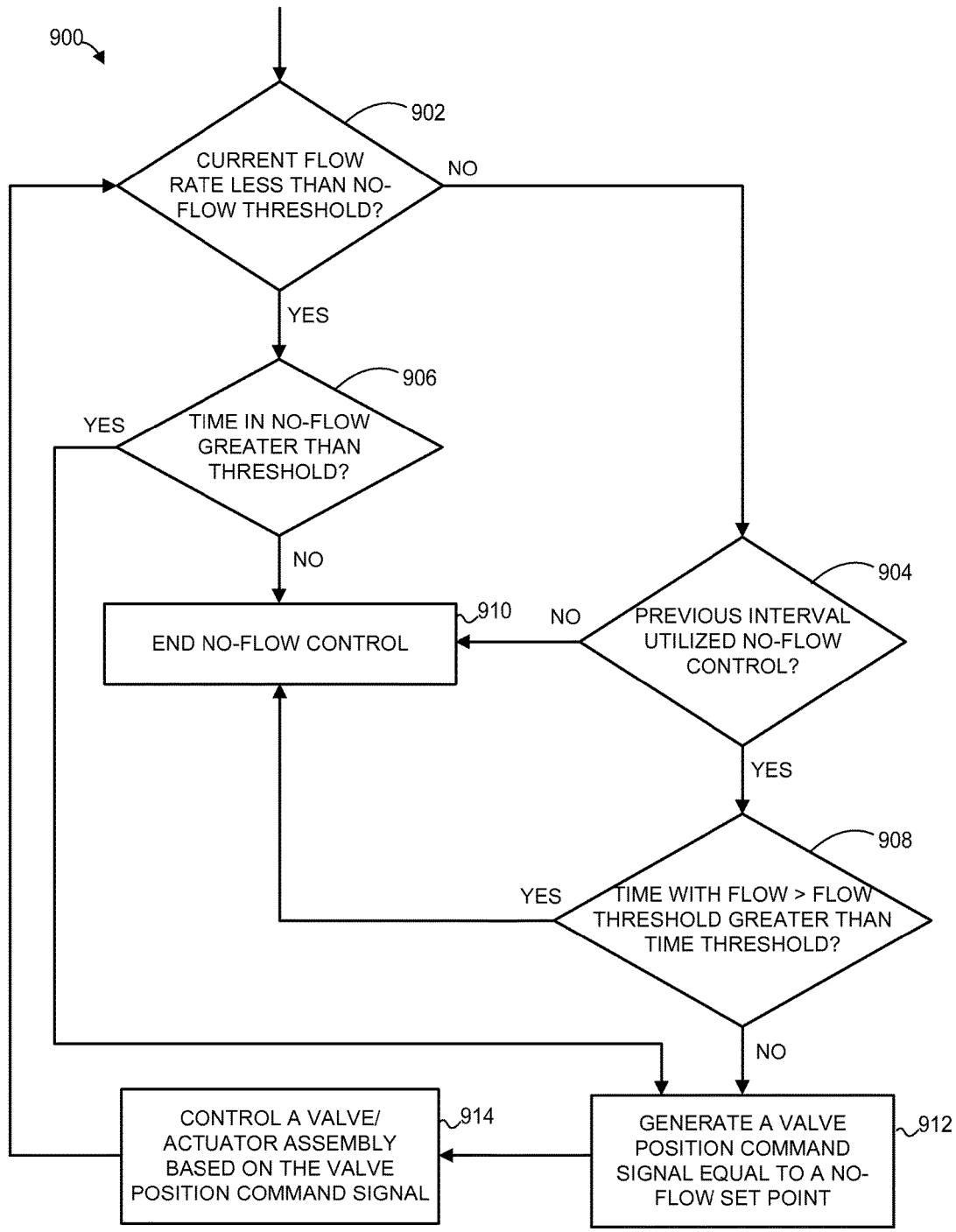
FIG. 9 is a flow diagram of an example method for controlling the injection of a fluid according to a no-flow control mode.

FIG. 9 is a flow diagram of an example method 900 for controlling a valve/actuator assembly according to a no-flow control mode. The method 900 may be implemented by one of the RTUs 35, 36, 37, 220, 300, or 400, for example. Specifically, the no-flow control module 414 of the RTU 400 may implement at least some of the functionality discussed with reference to the method 900. For ease of discussion, components of the example RTU 400 are referred to below. However, any suitable process control devices or combination of process control devices may implement the functionality discussed with reference to method 900.

In the example method 900, the no-flow control module 414 may determine if a flow rate of an injected fluid is below one or more thresholds (block 902). In some scenarios, a flow rate of an injected fluid may drop below the one or more thresholds because of a disruption at an injection supply source, such as one of the injection supply sources 204 or 308. To detect these or other scenarios, the no-flow control module 414 compare a measured flow rate value of the injected fluid to a threshold to determine if the measured flow rate value is below the threshold. If the measured flow rate value is not below the threshold, the flow of method 900 may continue to block 904. However, if the measured flow rate is below the threshold, the flow of method 900 may continue to block 906.

At block 904, the no-flow control module 414 may determine if a previous control interval of the RTU 400 utilized a no-flow control mode. If a previous control interval, as further discussed with reference to FIG. 6, was set such that the RTU 400 controls according to a no-flow control mode, the flow of the method 900 may continue to block 908. Otherwise, the flow of the method 900 continues to block 910 where control according to a no-flow control mode ends.

At block 908, the no-flow control module 414 may determine if a length of time is greater than a time threshold, where the length of time indicates how long the detected flow rate of the injected fluid has been greater than the flow threshold of block 902. In this manner, the no-flow control module 414 may account for flow rates "hovering" around the flow threshold of block 902 while avoiding many transitions between a no-flow control mode and other control modes. If the length of time is greater than the time threshold, the flow of method 900 may continue to block 910 where control according to a no-flow control mode ends. However, if the length of time is equal to less than the time threshold, the flow of method 900 may continue to block 912.

At block 906, the no-flow control module 414 may also determine if a length of time is greater than a time threshold, where, in the case of block 906, the length of time indicates how long the detected flow rate of the injected fluid has been less than the flow threshold of block 902. If the length of time is less than or equal to the time threshold, the flow of method 900 may continue to block 910 where control according to a no-flow control mode ends. However, if the length of time is greater than the time threshold (at block 906), the flow of method 900 may continue to block 912.

Whether arriving at block 912 via block 908 or 906, the no-flow control module 414 may generate a valve command signal equal to a no-flow setpoint (block 912) and control a valve/actuator assembly based on this valve command signal (block 914). This no-flow setpoint may be different than the setpoints associated with a primary objective control module and an override objective control module. Specifically, the no-flow setpoint may be defined such that the generated valve command signal causes a valve/actuator assembly to be "choked" (e.g., partially close or exhibiting a partial amount of travel) or fully closed. In this manner, the choked or closed valve/actuator assembly may mitigate surges (e.g., in flow rate or pressure) of an injected fluid once a supply of the injected fluid is restored.

Additional Considerations

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The following aspects represent examples of embodiments of the presently described methods and systems. This list of aspects is intended to be non-limiting, as other embodiments are clearly contemplated in view of the present description.

1. A method of controlling at least one of a flow rate or pressure of an injected fluid, the method comprising:

receiving a measured value indicative of the at least one of the flow rate or the pressure of the injected fluid;

determining a control mode for controlling the at least one of the flow rate or the pressure, wherein determining the control mode includes selecting the control mode from a plurality of control modes based on the measured value; and controlling the at least one of the flow rate or the pressure of the injected fluid according to the selected control mode including:

determining a command signal to be communicated to a field device, the field device coupled to a line through which the injected fluid flows, and communicating the command signal to the field device.

2. The method of aspect 1, wherein selecting the control mode from the plurality of control modes includes selecting the control mode from:

a primary objective control mode to maintain a reservoir pressure within a reservoir, wherein the injected fluid is injected into the reservoir, and an override objective control mode to reduce the pressure of the injected fluid such that the pressure is at or below a threshold.

3. The method of aspect 2, wherein the measured value indicates the pressure of the injected fluid, and wherein selecting one of the primary objective control mode or the override objective control mode includes:

if the pressure of the injected fluid is at or below the threshold, selecting the primary objective control mode, and if the pressure of the injected fluid is above the threshold, selecting the override objective control mode.

4. The method of any one of the preceding aspects, wherein selecting the control mode from the plurality of control modes includes selecting the control mode from:

a primary objective control mode to maintain a reservoir pressure within a reservoir, wherein the injected fluid is injected into the reservoir, an override objective control mode to reduce the pressure of the injected fluid such that the pressure is at or below a pressure threshold, and a no-flow control mode to control the field device when the flow rate of the injected fluid drops below a flow rate threshold.

5. The method of aspect 4, wherein the measured value indicates the flow rate of the injected fluid, and wherein selecting one of the primary objective control mode, the override objective control mode, and the no-flow control mode includes:

if the flow rate of the injected fluid is at or below the threshold, selecting the no-flow control mode, and if the flow rate of the injected fluid is above the threshold, selecting one of the primary objective control mode or the override objective control mode.

6. The method of any one of the preceding aspects, wherein selecting the control mode from the plurality of control modes includes selecting the control mode from three or more control modes.

7. The method of aspect 6, wherein controlling the flow rate or the pressure of the injected fluid according to the selected control mode includes controlling the flow rate according to a particular setpoint corresponding to the selected control mode, wherein the particular setpoint is different from a plurality of other setpoints, wherein each of the plurality of other setpoints corresponds to one of the three or more control modes other than the selected control mode.

8. The method of any one of the preceding aspects, wherein controlling the flow rate or the pressure of the injected fluid according to the selected control mode includes controlling the flow rate according to a particular setpoint corresponding to the selected control mode, wherein the particular setpoint is different from another setpoint corresponding to one of the plurality of control modes other than the selected control mode.

9. The method of any one of the preceding aspects, wherein controlling the flow rate or the pressure of the injected fluid according to the selected control mode includes controlling the flow rate according to a particular set of parameters corresponding to a particular control loop feedback mechanism of the selected control mode, wherein the particular set of parameters is different from another set of parameters corresponding to another control loop feedback mechanism of one of the plurality of control modes other than the selected control mode.

10. The method of any one of the preceding aspects, wherein controlling the flow rate or the pressure of the injected fluid according to the selected control mode includes controlling the flow rate or the pressure of the injected fluid according to the selected control mode for a pre-determined time interval, wherein the received measured value is an initial measured value, and wherein the selected control mode is an initial control mode, the method further comprising:

after the pre-determined time interval, receiving a subsequent measured value indicative of the at least one of the flow rate or the pressure of the injected fluid; and determining a subsequent control mode for controlling the at least one of the flow rate or the pressure, wherein determining the subsequent control mode includes selecting the subsequent control mode from the plurality of control modes based on the subsequent measured value.

11. A process control system comprising:

a process control device configured to control an injection of a fluid;

a first communicative link between the process control device and at least one of a pressure sensor detecting a pressure of the fluid and a flow element detecting a flow rate of the fluid; and a second communicative link between the process control device and a field device, wherein the process control device communicates with the field device to control at least one of the pressure or the flow rate of the fluid, wherein the process control device is configured to:

receive, via the first communicative link, a measured value indicative of the at least one of the flow rate or the pressure of the fluid, determine a control mode for controlling the at least one of the flow rate or the pressure of the fluid, wherein determining the control mode includes selecting the control mode from a plurality of control modes based on the measured value, and control, via the second communicative link, the at least one of the flow rate or the pressure of the injected fluid according to the selected control mode.

12. The process control system of aspect 11, wherein the process control device is configured to control the injection of the fluid, at a wellhead, into a reservoir.

13. The process control system of either aspect 11 or aspect 12, wherein the process control device is configured to control the injection of the fluid into a heap of ore.

14. The process control system of any one of aspects 11 to 13, wherein the process control device and the field device are disposed on a skid, and wherein the skid is operatively coupled to a line through which the fluid travels.

15. The process control system of any one of aspects 11 to 14, wherein:
the field device is a first field device,
the second communicative link communicatively links the process control device to the first field device and a plurality of other field devices, and
the process control device communicates, via the second communicative link, with the first field device and with the plurality of other field devices to control the at least one of the pressure or the flow rate of the fluid in a plurality of lines splitting off from a header.

16. The process control system of any one of aspects 11 to 15, wherein controlling the at least one of the flow rate or the pressure of the injected fluid according to the selected control mode includes:
determining a command signal to be communicated, via the second communicative link, to a field device, and
communicating the command signal to the field device.

17. A process control device comprising:
one or more processors;
a communication module configured to receive a measured value indicative of a pressure or flow rate of a fluid;
a primary objective control module specifically configuring the process control device such that, when executed by the one or more processors, the primary objective control module causes the process control device to maintain a reservoir pressure within a reservoir based on an injection of the fluid into the reservoir;
an override objective control module specifically configuring the process control device such that, when executed by the one or more processors, the override objective control module causes the process control device to reduce a measured pressure of the fluid to a level at or below a pressure threshold;
a control mode selector configured to:
select one of the primary objective control module or the override objective control module based on the measured value, and
cause the one or more processors to execute the selected one of the primary objective control module or the override objective control module.

18. The process control device of aspect 17, further comprising:
a no-flow control module specifically configuring the process control device such that, when executed by the one or more processors, the no-flow control module causes the process control device to position a valve at a pre-determined position until the flow rate of the fluid is equal to or greater than a flow rate threshold,
where the control mode selector is further configured to, before selecting the one of the primary objective control module or the override objective control module based on the measured value:
determine if the flow rate of the fluid is less than the flow rate threshold based on the measured value,
if the flow rate of the fluid is less than the flow rate threshold, cause the one or more processors to execute the no-flow control module.

19. The process control device of either aspect 17 or aspect 18, wherein the primary objective control module includes a first proportional-integral-derivative (PID) controller algorithm configured with first parameters, wherein the override objective control module includes a second PID controller algorithm configured with second parameters, and wherein the first parameters of the first PID controller algorithm are different than the second parameters of the second PID controller algorithm.

20. The process control device of any one of aspects 17 to 19, wherein the primary objective control module causes the process control device to maintain the reservoir pressure based on a first setpoint, wherein the override objective control module causes the process control device to reduce the measured pressure based on a second setpoint, and wherein the first setpoint is different than the second setpoint.

What is claimed is:

1. A method of controlling a flow rate and a pressure of an injected fluid, the method comprising:
receiving a first measured value indicative of the flow rate and a second measured value indicative of the pressure of the injected fluid;
determining a first control mode for controlling the flow rate at or below a level of a flow rate threshold and the pressure at or below a level of a pressure threshold, wherein determining the first control mode includes selecting the first control mode from a plurality of control modes, wherein the first control mode is implemented using a first proportional-integral-differential (PID) control loop, and wherein first proportional-integral-differential (PID) control loop parameters are selected from the group: a proportional parameter, an integral parameter, a derivative parameter, and a setpoint;
controlling the flow rate and the pressure of the injected fluid according to the first control mode for a first period of time including:
determining a first command signal to be communicated to a field device, the field device coupled to a line through which the injected fluid flows, and
communicating the first command signal to the field device,
determining a second control mode for controlling the pressure to reduce a pressure of an injected fluid to a level below the pressure threshold, wherein determining the second control mode includes selecting a second control mode from the plurality of control modes, wherein the second control mode is implemented using a second proportional-integral-differential (PID) control loop, wherein second proportional-integral-differential (PID) control loop parameters are selected from the group: a proportional parameter, an integral parameter, a derivative parameter, and a setpoint, and wherein the second proportional-integral-differential (PID) control loop parameters are different than the first proportional-integral-differential (PID) control loop parameters; and
controlling the flow rate and the pressure of the injected fluid according to the second control mode for a second period of time including:
determining a second command signal to be communicated to the field device, and
communicating the second command signal to the field device.

2. The method of claim 1, wherein the plurality of control modes includes:
a primary objective control mode to maintain a reservoir pressure within a reservoir, wherein the injected fluid is injected into the reservoir, and
an override objective control mode to reduce the pressure of the injected fluid such that the pressure is below the threshold.

3. The method of claim 2, wherein the measured value indicates the pressure of the injected fluid, wherein the first control mode is the primary objective control mode and the second control mode is the override objective control mode, and wherein selecting one of the primary objective control mode or the override objective control mode includes:
- if the pressure of the injected fluid is at or below the threshold, selecting the primary objective control mode, and
- if the pressure of the injected fluid is above the threshold, selecting the override objective control mode.

4. The method of claim 1, wherein the plurality of control modes includes:
- a primary objective control mode to maintain a reservoir pressure within a reservoir, wherein the injected fluid is injected into the reservoir,
- an override objective control mode to reduce the pressure of the injected fluid such that the pressure is at or below a pressure threshold, and
- a no-flow control mode to control the field device when the flow rate of the injected fluid drops below a flow rate threshold.

5. The method of claim 4, wherein the measured value indicates the flow rate of the injected fluid, wherein the first control mode is the primary objective control mode and the second control mode is the override objective control mode, and wherein selecting one of the primary objective control mode, the override objective control mode, and the no-flow control mode includes:
- if the flow rate of the injected fluid is at or below the threshold, selecting the no-flow control mode, and
- if the flow rate of the injected fluid is above the threshold, selecting one of the primary objective control mode or the override objective control mode.

6. The method of claim 1, wherein selecting the first and second control modes from the plurality of control modes includes selecting the first and second control mode from three or more control modes.

7. The method of claim 6, wherein controlling the flow rate or the pressure of the injected fluid according to the first and second control modes includes controlling the flow rate according to a particular setpoint corresponding to the first or second control mode, wherein the particular setpoint is different from a plurality of other setpoints, wherein each of the plurality of other setpoints corresponds to one of the three or more control modes other than the first or second control mode.

8. The method of claim 1, wherein controlling the flow rate or the pressure of the injected fluid according to the first or second control mode includes controlling the flow rate according to a particular setpoint corresponding to the first or second control mode, wherein the particular setpoint is different from another setpoint corresponding to one of the plurality of control modes other than the first or second control mode.

9. The method of claim 1, wherein controlling the flow rate or the pressure of the injected fluid according to the first or second control mode includes controlling the flow rate according to a particular set of parameters corresponding to a particular control loop feedback mechanism of the first or second control mode, wherein the particular set of parameters is different from another set of parameters corresponding to another control loop feedback mechanism of one of the plurality of control modes other than the first or second control mode.

10. The method of claim 1, wherein controlling the flow rate or the pressure of the injected fluid according to the first or second control mode includes controlling the flow rate or the pressure of the injected fluid according to the first or second control mode for a pre-determined time interval, wherein the received measured value is an initial measured value, and wherein the first or second control mode is an initial control mode, the method further comprising:
- after the pre-determined time interval, receiving a subsequent measured value indicative of the at least one of the flow rate or the pressure of the injected fluid; and
- determining a subsequent control mode for controlling the at least one of the flow rate or the pressure, wherein determining the subsequent control mode includes selecting the subsequent control mode from the plurality of control modes based on the subsequent measured value.

11. A process control system comprising:
- a process control device configured to control an injection of a fluid;
- a first communicative link between the process control device and at least one of a pressure sensor detecting a pressure of the fluid and a flow element detecting a flow rate of the fluid; and
- a second communicative link between the process control device and a field device, wherein the process control device communicates with the field device to control the pressure and the flow rate of the fluid,
- wherein the process control device is configured to:
- receive, via the first communicative link, a first measured value indicative of the flow rate and a second measured value indicative of the pressure of the fluid,
- determine a first control mode for controlling the flow rate and the pressure of the fluid, wherein determining the first control mode includes selecting the first control mode from a plurality of control modes, wherein the first control mode is implemented using a first proportional-integral-differential (PID) control loop, and wherein first proportional-integral-differential (PID) control loop parameters are selected from the group: a proportional parameter, an integral parameter, a derivative parameter, and a setpoint,
- control, via the second communicative link, the flow rate and the pressure of the injected fluid at or below a level of a respective threshold for a first period of time according to the first control mode,
- determine a second control mode for controlling the pressure of the fluid, wherein determining the second control mode includes selecting the second control mode from the plurality of control modes, wherein second proportional-integral-differential (PID) control loop parameters are selected from the group: a proportional parameter, an integral parameter, a derivative parameter, and a setpoint, and wherein the second proportional-integral-differential (PID) control loop parameters are different than the first proportional-integral-differential (PID) control loop parameters, and
- control, via the second communicative link, the at least one of the flow rate or the pressure of the injected fluid below a level of the threshold for a second period of time according to the second-control mode.

12. The process control system of claim 11, wherein the process control device is configured to control the injection of the fluid, at a wellhead, into a reservoir.

13. The process control system of claim 11, wherein the process control device is configured to control the injection of the fluid into a heap of ore.

14. The process control system of claim 11, wherein the process control device and the field device are disposed on a skid, and wherein the skid is operatively coupled to a line through which the fluid travels.

15. The process control system of claim 11, wherein:
the field device is a first field device,
the second communicative link communicatively links the process control device to the first field device and a plurality of other field devices, and
the process control device communicates, via the second communicative link, with the first field device and with the plurality of other field devices to control the at least one of the pressure or the flow rate of the fluid in a plurality of lines splitting off from a header.

16. The process control system of claim 11, wherein controlling the flow rate or the pressure of the injected fluid according to the first or second control mode includes:
determining a command signal to be communicated, via the second communicative link, to a field device, and
communicating the command signal to the field device.

17. A process control device comprising:
one or more processors;
a communication module configured to receive a first measured value indicative of a pressure and a second measured value indicative of a flow rate of a fluid;
a primary objective control module specifically configuring the process control device such that, when executed by the one or more processors, the primary objective control module causes the process control device to maintain a reservoir pressure within a reservoir at or below a pressure threshold and a flow rate of fluid into the reservoir at or below a flow rate threshold based on an injection of the fluid into the reservoir for a first period of time by implementing a first proportional-integral-differential (PID) control loop, and wherein first proportional-integral-differential (PID) control loop parameters are selected from the group: a proportional parameter, an integral parameter, a derivative parameter, and a setpoint;
an override objective control module specifically configuring the process control device such that, when executed by the one or more processors, the override objective control module causes the process control device to reduce a measured pressure of the fluid to a level below the pressure threshold for a second period of time by implementing a second proportional-integral-differential (PID) control loop, wherein second proportional-integral-differential (PID) control loop parameters are selected from the group: a proportional parameter, an integral parameter, a derivative parameter, and a setpoint, and wherein the second proportional-integral-differential (PID) control loop parameters are different than the first proportional-integral-differential (PID) control loop parameters;
a control mode selector configured to:
select one of the primary objective control module or the override objective control module based on the first and second measured values, and
cause the one or more processors to execute the primary objective control module for the first period of time and the override objective control module for the second period of time.

18. The process control device of claim 17, further comprising:
a no-flow control module specifically configuring the process control device such that, when executed by the one or more processors, the no-flow control module causes the process control device to position a valve at a pre-determined position until the flow rate of the fluid is equal to or greater than a flow rate threshold,
where the control mode selector is further configured to, before selecting the one of the primary objective control module or the override objective control module based on the measured value:
determine if the flow rate of the fluid is less than the flow rate threshold based on the measured value,
if the flow rate of the fluid is less than the flow rate threshold, cause the one or more processors to execute the no-flow control module.

19. The process control device of claim 17, wherein the primary objective control module includes a first proportional-integral-derivative (PID) controller algorithm configured with first parameters, wherein the override objective control module includes a second PID controller algorithm configured with second parameters, and wherein the first parameters of the first PID controller algorithm are different than the second parameters of the second PID controller algorithm.

20. The process control device of claim 17, wherein the primary objective control module causes the process control device to maintain the reservoir pressure based on a first setpoint, wherein the override objective control module causes the process control device to reduce the measured pressure based on a second setpoint, and wherein the first setpoint is different than the second setpoint.

* * * * *

UNITED STATES PATENT AND TRADEMARK OFFICE
CERTIFICATE OF CORRECTION

| | | |
|---|---|---|
| PATENT NO. | : 10,481,618 B2 | Page 1 of 2 |
| APPLICATION NO. | : 14/685069 | |
| DATED | : November 19, 2019 | |
| INVENTOR(S) | : Thomas Matthew Mills | |

It is certified that error appears in the above-identified patent and that said Letters Patent is hereby corrected as shown below:

In the Drawings

At Fig. 1, Sheet 1 of 9, Tag "44", Line 1, "WELLHEAD," should be -- WELLHEAD --.

At Fig. 5, Sheet 5 of 9, and on the title page, the print figure, Tag "500", Line 2, "OJECTIVE" should be -- OBJECTIVE --.

In the Specification

At Column 1, Line 11, "2015" should be -- 2014 --.

At Column 1, Line 14, "2015," should be -- 2014, --.

At Column 4, Line 44, "an fluid" should be -- a fluid --.

At Column 5, Line 24, "computer" should be -- computing --.

At Column 11, Line 23, "split be" should be -- split by --.

At Column 11, Line 28, "RTU 500" should be -- RTU 400 --.

At Column 13, Line 7, "second," should be -- seconds, --.

At Column 15, Line 15, "an maximum" should be -- a maximum --.

At Column 15, Line 30, "702)." should be -- 802). --.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,481,618 B2

In the Claims

At Column 20, Line 32, in Claim 1, "flows, and" should be -- flows, --.

At Column 23, Line 12, in Claim 16, "controlling" should be -- controlling the at least one of --.